United States Patent
Ghadge et al.

(10) Patent No.: US 10,855,517 B2
(45) Date of Patent: Dec. 1, 2020

(54) REDUNDANCY SUPPORT FOR CONTROL AND USER PLANE SEPARATION

(71) Applicant: Cisco Technology, Inc., San Jose, CA (US)

(72) Inventors: Amit Ghadge, Pune (IN); Nithin Chitta, Pune (IN); Sanjeev Panem Jaya, Pune (IN); Anand Arun Alshi, Pune (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/182,958

(22) Filed: Nov. 7, 2018

(65) Prior Publication Data

US 2020/0145278 A1    May 7, 2020

(51) Int. Cl.
*H04W 40/00* (2009.01)
*H04L 12/24* (2006.01)
*H04L 12/26* (2006.01)

(52) U.S. Cl.
CPC ...... *H04L 41/0668* (2013.01); *H04L 43/0817* (2013.01); *H04L 43/10* (2013.01)

(58) Field of Classification Search
CPC .............. H04W 40/00; H04W 72/0426; H04L 41/0668; H04L 43/10; H04L 43/0817
See application file for complete search history.

(56) References Cited

U.S. PATENT DOCUMENTS

| | | | |
|---|---|---|---|
| 5,014,261 A | 5/1991 | Shinbashi et al. | |
| 6,999,783 B2 | 2/2006 | Toyryla et al. | |
| 7,092,354 B2 | 8/2006 | Jensen | |
| 7,423,962 B2 | 9/2008 | Auterinen | |
| 9,832,659 B2 | 11/2017 | Yi et al. | |
| 10,069,904 B2 | 9/2018 | Singh et al. | |
| 2003/0117983 A1 | 6/2003 | Ton et al. | |
| 2010/0220656 A1* | 9/2010 | Ramankutty | H04L 45/025 370/328 |
| 2011/0235505 A1 | 9/2011 | Eswara et al. | |
| 2013/0121298 A1 | 5/2013 | Rune et al. | |

(Continued)

FOREIGN PATENT DOCUMENTS

| | | |
|---|---|---|
| WO | 2016150623 A1 | 9/2016 |
| WO | 2017125179 A1 | 7/2017 |

(Continued)

OTHER PUBLICATIONS

3GPP Organizational Partners, "3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401 V15.5.0, Sep. 2018, 410 pages.

(Continued)

*Primary Examiner* — Wei Zhao

(57) ABSTRACT

In one embodiment, a method is performed. A first user plane entity may be associated with a user plane group comprising a plurality of user plane entities. The first user plane entity may be associated with a second user plane entity. A failure of the second user plane entity may be detected. In response to detecting the failure of the second user plane entity, the first user plane entity may be activated.

20 Claims, 4 Drawing Sheets

(56) References Cited

U.S. PATENT DOCUMENTS

| | | | |
|---|---|---|---|
| 2013/0344887 A1 | 12/2013 | Wachter | |
| 2015/0124585 A1* | 5/2015 | Sahin | H04W 36/12 370/218 |
| 2016/0353462 A1* | 12/2016 | Jiang | H04W 24/02 |

FOREIGN PATENT DOCUMENTS

| WO | 2018001522 A1 | 1/2018 |
|---|---|---|
| WO | 2018009340 A1 | 1/2018 |

OTHER PUBLICATIONS

3GPP Organizational Partners, "3rd Generation Partnership Project; Technical Specification Group Services and System Aspects; Architecture enhancements for control and user plane separation of EPC nodes; Stage 2 (Release 15)", 3GPP TS 23.214 V15.4.0, Sep. 2018, 92 pages.

3GPP Organizational Partners, "3rd Generation Partnership Project; Technical Specification Group Services and System Aspects; Study on control and user plane separation of EPC nodes (Release 14)", 3GPP TR 23.714 V14.0.0, Jun. 2016, 87 pages.

3GPP Organizational Partners, "3rd Generation Partnership Project; Technical Specification Group Core Network and Terminals; Interface between the Control Plane and the User Plane Nodes; Stage 3 (Release 15)", 3GPP TS 29.244 V15.3.0, Sep. 2018, 189 pages.

3GPP Organizational Partners, "3rd Generation Partnership Project; Technical Specification Group Core Network and Terminals; Study on Control and User Plane Separation of EPC Nodes (Release 14)", 3GPP TR 29.844 V14.0.0, Jun. 2017, 52 pages.

3GPP Organizational Partners, "3rd Generation Partnership Project; Technical Specification Group Services and System Aspects; Study on Architecture for Next Generation System (Release 14)", 3GPP TR 23.799 V14.0.0, Dec. 2016, 522 pages.

3GPP Organizational Partners, "3rd Generation Partnership Project; Technical Specification Group Services and System Aspects; Telecommunication management; Charging management; Packet Switched (PS) domain charging (Release 15)", 3GPP TS 32.251 V15.3.0, Jun. 2018, 187 pages.

International Search Report and Written Opinion in counterpart International Application No. PCT/US2019/029073 dated Jul. 31, 2019, 16 pages.

S. Wadhwa et al., "Architecture for Control and User Plane Separation on BNG draft-wadhwa-rtgwg-bng-cups-01.txt", rtgwg, Jul. 16, 2018, 20 pages.

EANTC AG, "Huawei's Cloud-based Broadband Network Gateway Solution Performance, Resiliency and Functionality", Mar. 2018, 15 pages.

* cited by examiner

REDUNDANCY SUPPORT FOR CONTROL AND USER PLANE SEPARATION

TECHNICAL FIELD

The present disclosure generally relates to wireless networking.

BACKGROUND

In some evolved packet core (EPC) architectures, control and user plane separation (CUPS) provides for separation of entities, such as a serving gateway (SGW) or a packet data network (PDN) gateway (PGW) into its constituent user plane and control plane functionalities. CUPS may enable more flexibility and independent scalability that may be suitable for network function virtualization (NFV) or software defined network (SDN) embodiment. The mobility control provided by a general packet radio service (GPRS) tunneling protocol (GTP) may be maintained, e.g., retained between evolved nodes.

BRIEF DESCRIPTION OF THE DRAWINGS

For an understanding of aspects of various embodiments described herein and to show how they may be carried into effect, reference is made, by way of example only, to the accompanying drawings.

DESCRIPTION OF EXAMPLE EMBODIMENTS

Overview

Figure 1:
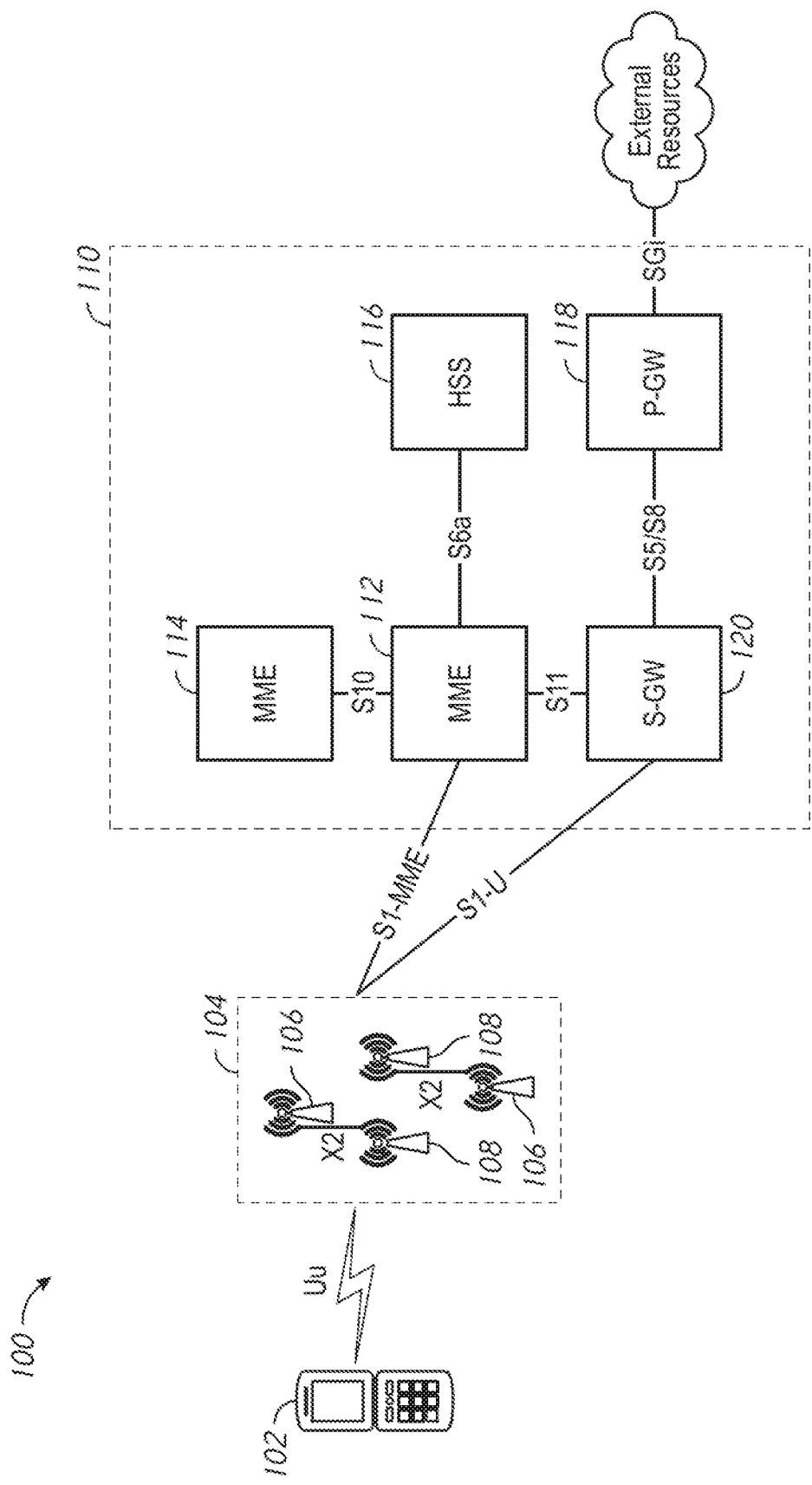
FIG. 1 is a diagram that illustrates an example network.

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Various embodiments disclosed herein may include devices, systems, and methods for providing resiliency in networks in which control plane entities and user plane entities are separated. Redundancy may mitigate adverse effects from failure of an active user plane entity by providing a standby or backup user plane entity that may have packet data network (PDN) information associated with the active user plane entity and that may become active when needed.

In an embodiment, a method may be performed. A first user plane entity may be associated with a user plane group comprising a plurality of user plane entities. The first user plane entity may be associated with a second user plane entity. A failure of the second user plane entity may be detected. In response to detecting the failure of the second user plane entity, the first user plane entity may be activated.

Example Embodiments

FIG. 1 illustrates an example long term evolution (LTE) network 100. The LTE network 100 may include a user equipment (UE) device 102, such as a mobile telephone. It will be appreciated that the LTE network 100 typically includes multiple UE devices; however, one UE device is depicted for purposes of simplicity.

The LTE network 100 may include an access network, e.g., an evolved universal mobile telecommunications system (UMTS) terrestrial radio access network (E-UTRAN) 104. The UE device 102 may communicate with the E-UTRAN 104 via a Uu interface. The E-UTRAN 104 may include one or more E-UTRAN Node B, also known as evolved node B (e.g., eNodeB or eNB), entities 106. The E-UTRAN 104 may include one or more next generation NodeB (gNB) entities 108. The one or more gNB entities 108 may be in communication with the one or more eNB entities 106 via one or more X2 interfaces.

The LTE network 100 may include a core network, e.g., an evolved packet core (EPC) network 110. The E-UTRAN 104 may communicate with the EPC network 110 using an S1 interface, which may include an S1-MME interface and/or an S1-U interface. The EPC network 110 may include one or more mobility management entities (MMEs) 112, 114. The one or more MMEs 112, 114 may communicate with the E-UTRAN 104 via an S1-MME interface and may communicate with one another via a S10 interface. The one or more MMEs 112, 114 may control high-level operation of the LTE network 100 using signaling messages and a home subscriber server (HSS) 116, with which they may communicate via a S6a interface. The HSS 116 may serve as a central database that may include information regarding the network operator's subscribers.

The EPC network 110 may also include a packet data network (PDN) gateway (PGW) 118. The PGW 118 may communicate with external resources, e.g., servers and/or packet data networks, via the SGi interface. A serving gateway (SGW) 120 may communicate with the one or more MMEs 112, 114 using an S11 interface and with the E-UTRAN 104 using the S1-U interface. The SGW 120 may forward data between a base station and the PGW 118. The SGW 120 and PGW 118 may communicate with one another via an S5/S8 interface.

When the UE device 102 establishes a connection with the network 100, an eNB entity 106 may select a MME, e.g., the MME 112 or the MME 114, with which the UE device 102 may register. If the UE device 102 has fifth generation (5G) capability, it may publish its 5G capability in non-access stratum (NAS) messaging. An MME that has 5G non-standalone architecture (NSA) capability may extract the capability information of the UE device 102 from the NAS messaging and may receive 5G subscription information for the subscriber from the HSS 116. A 5G-capable MME may assist in establishing 5G sessions in the network 100.

In some embodiments, control plane functionalities and user plane functionalities may be separated in a control and user plane separation (CUPS) architecture. CUPS may support the ability to scale the user plane and the control plane independently of one another. CUPS may support a 5G-ready architecture. CUPS may support data center purity. CUPS may support service level agreement (SLA) differences. CUPS may support a reduced state distribution. Savings on backhaul costs may be realized. Flexibility may be enhanced, in that different user planes may be provided and/or used for different applications. CUPS may provide multi-gigabit throughput per PDN. With control processing performed separately from the user plane, node-level performance may be improved. CUPS may support the ability to cater to low latency use cases.

Gateway functionalities, such as SGW and/or PGW, may be complex network functions that may support 3GPP procedures and value-added features. Control and user plane separation may involve managing hundreds of user plane entities by a control plane entity. The user plane entities may be geographically located far apart. Operational challenges may exist in managing the user plane and control plane entities.

Figure 2:
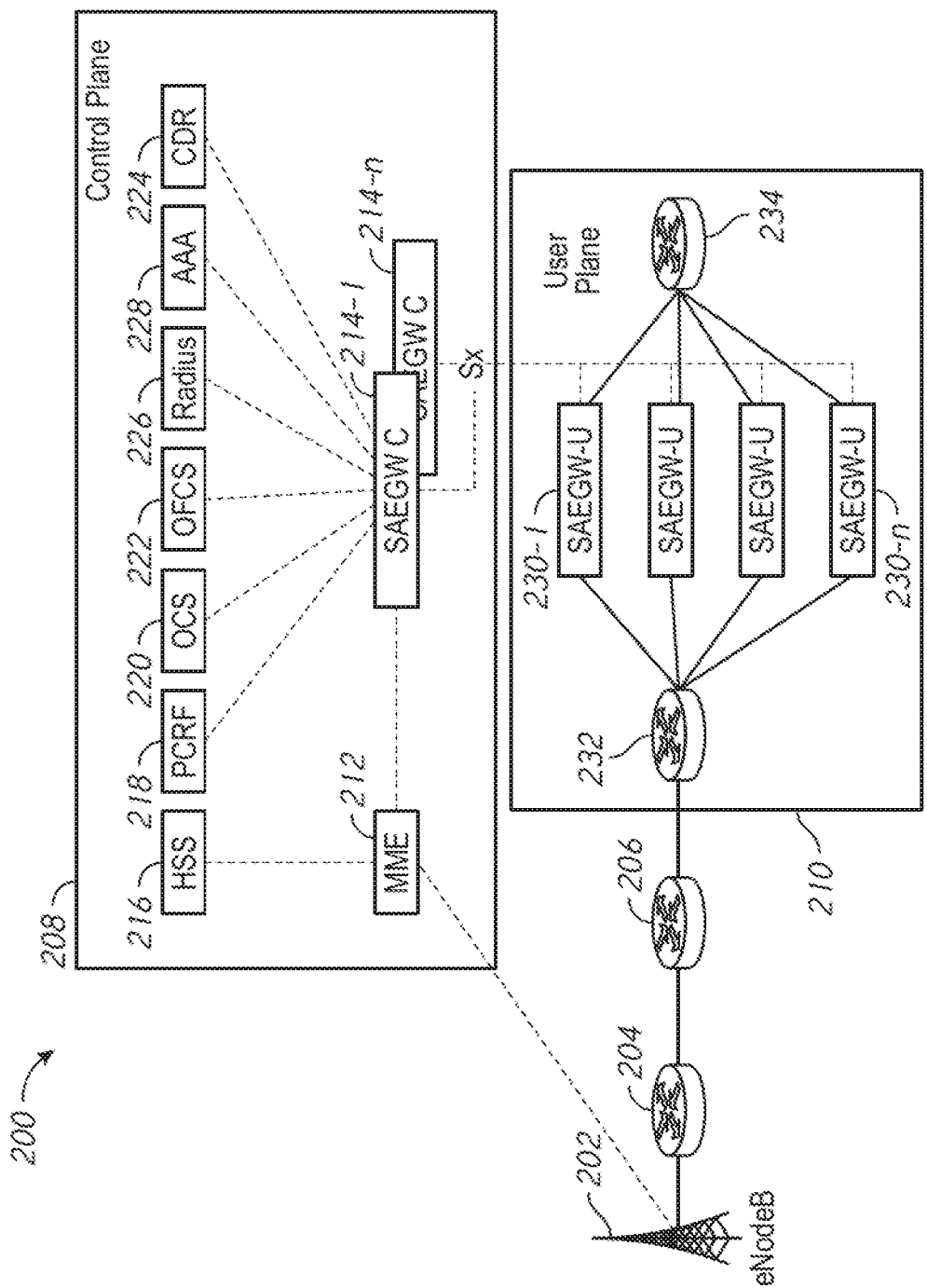
FIG. 2 is a diagram that illustrates an example network.

FIG. 2 is a diagram illustrating an example network 200. The network 200 may include an eNB entity 202 and/or a gNB entity (not shown). The eNB entity 202 may be in communication with one or more routers 204, 206. The network 200 may include a control plane entity 208 and a user plane entity 210.

The control plane entity 208 may include a mobility management entity (MME) 212 that may be in communication with the eNB entity 202. The MME 212 may control high-level operation of the network using signaling messages and a home subscriber server (HSS) 214, with which it may communicate via a S6a interface. The HSS 214 may serve as a central database that may include information regarding the network operator's subscribers.

The MME 212 may communicate with one or more system architecture evolution (SAE) gateway (GW) control plane (SAEGW C) entities 216-1, . . . , 216-n. An SAEGW node may implement SGW and/or PGW functionality. Functionalities of an SAEGW node may be divided between control plane (SAEGW C) and user plane (SAEGW U) entities that may reside in the control plane entity 208 and the user plane entity 210, respectively.

The one or more SAEGW C entities 216-1, . . . , 216-n may communicate with other control plane functional entities. A policy and charging rules function (PCRF) module 218 may manage flow-based charging, including charging control and online credit control, e.g., for service data flows and application traffic. The PCRF module 218 may perform policy control, including, but not limited to gating control, quality of service (QoS) control, and/or QoS signaling.

An online charging system (OCS) module 220 may enable a service provider to charge a user for services in real time, e.g., as services are rendered. The OCS module 220 may handle functions relating to the subscriber's account balance, rating, charging transaction control, and/or correlation.

An offline charging system (OFCS) module 222 may enable a service provider to charge a user for services. Charging information for network resource usage may be collected as the network resource is used. The charging information may be passed through a chain of logical charging functions. Charging data records (CDRs) may be generated by a CDR module 224 and provided to a billing domain for charging users.

A remote authentication dial-in user service (RADIUS) module 226 may support remote user authentication and/or authorization and accounting between packet domains and packet data networks. The RADIUS module 226 may receive a user connection request from a user, authenticate the user, and return configuration information for a client device to deliver service to the user.

An authentication, authorization, and accounting (AAA) module 228 may support authentication and key generation. The AAA module 228 may exchange information, such as user credentials, keys, tokens, authorizations, etc. with the one or more SAEGW C entities 216-1, . . . , 216-n and/or with an AAA client module (not shown).

The SAEGW C entities 214-1, . . . , 214-n may communicate, e.g., via an Sx interface, with one or more SAEGW user plane (SAEGW U) entities 230-1, . . . , 230-n. The one or more SAEGW U entities 230-1, . . . , 230-n may be in communication with one or more routers, e.g., routers 232, 234.

In some embodiments, 1:1 user plane redundancy may be implemented. Carrier-grade resiliency may be provided to a CUPS solution. Highly resilient packet core functions may promote wireless data connectivity without any service impact in the event of failure of a particular SAEGW U entity 230. With the one or more SAEGW U entities 230-1, . . . , 230-n that may be geographically distributed, one or more SAEGW U entities 230-1, . . . , 230-n may be hosted at the edge of a mobile network. A redundancy mechanism for user plane entities may mitigate or prevent the effects of the failure of a user plane entity on service.

In some embodiments, one or more active user plane entities (e.g., each active user plane entity) may have a dedicated standby user plane entity. For example, there may be a 1:1 relationship between active user plane entities and standby user plane entities. The dedicated standby user plane entity may be programmed with the PDN information for its corresponding active user plane entity. If the active user plane entity fails, the dedicated standby user plane entity may (e.g., immediately) take over the impacted session or sessions and continue the service with little or no interruption.

Figure 3:
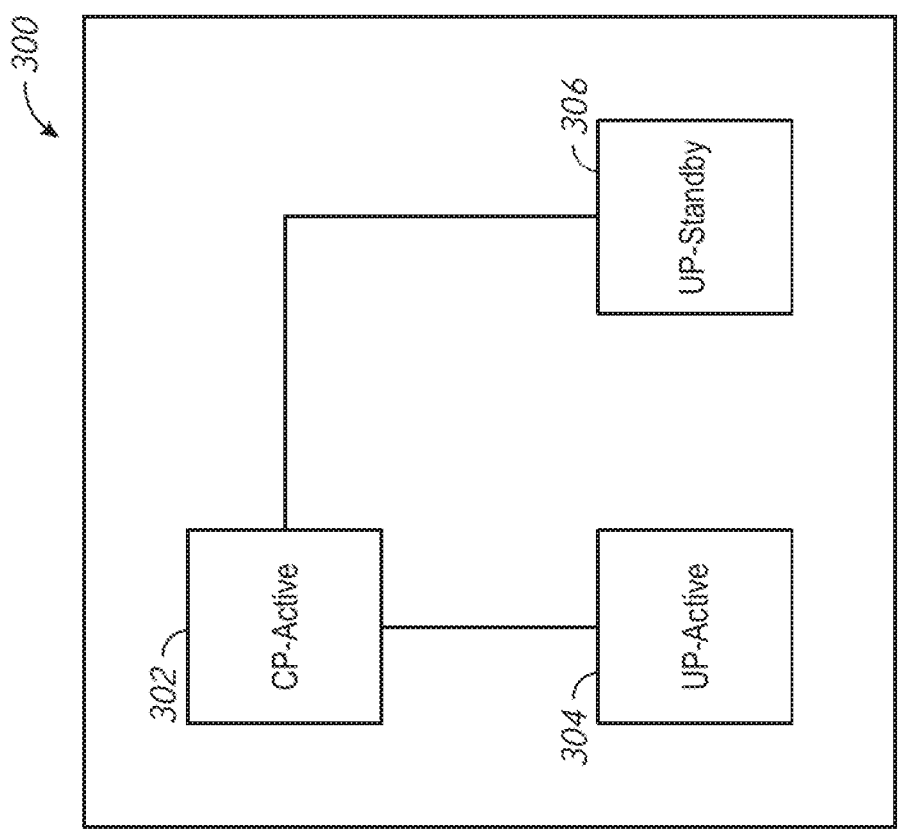
FIG. 3 is a diagram that illustrates an example system incorporating 1:1 user plane redundancy.

FIG. 3 illustrates an example system 300 incorporating 1:1 user plane redundancy according to an embodiment. A control plane entity 302 may be configured with one or more user plane groups. An example process for configuring the control plane entity 302 with one or more user plane groups may be disclosed in co-pending U.S. patent application Ser. No. 16/172,013, entitled USER PLANE GROUP, filed Oct. 26, 2018, the disclosure of which is hereby incorporated in its entirety. As part of the user plane group configuration process, active user plane entities and corresponding standby user plane entities may be designated. The relationship between active and standby user plane entities may be 1:1 or M:N.

A user plane group may be a list of user plane entities. A given user plane entity may belong to one user plane group. A user plane group may include user plane entities having the same capacity and capability. Different types of user plane entities may belong to different user plane groups.

A user plane group may be explicitly configured and may be known as a specific user plane group. A specific user plane group may facilitate grouping specific types of user plane entities together. This may help in reserving specific sets of user plane entities for a specific purpose. Multiple specific user plane groups may be configured.

A default user plane group may group user plane entities that are registered and that are not explicitly configured as part of a specific user plane group. A default user plane group may register user plane entities in a zero-touch manner without explicitly configuring a user plane entity on the control plane entity. A default user plane group may be suited for a collocated CUPS scenario in which the user plane entities may be of the same capacity and capability and may be located in the same data center. A default group may have an optimized user plane configuration on the control plane entity. A secret key may be used for authentication between the control plane entity and the user plane entity to prevent unauthorized user plane entities from registering to the control plane entity. The control plane entity may use the secret key to authorize the user plane entity to ensure that the user plane entity is an authorized user plane entity.

When configuring a user plane group, a network operator may group user plane entities 304, 306 into user plane groups that may be configured on the control plane entity. A given user plane entity may belong to one user plane group. A user plane group may be configured with a list of user plane entities that may be identified by their IPv6 or IPv6 transport IP addresses (e.g., node IDs).

During configuration of the user plane group, a user plane redundancy type may be configured. For example, user plane redundancy may be configured as N:M type redundancy. According to an embodiment, user plane redundancy may be configured as 1:1 type redundancy. The type of redundancy applied to a user plane entity may depend on the user plane group to which the user plane entity belongs and the redundancy type configured for that user plane group. For either redundancy mode or type, one or more standby user plane entities may be designated for an active user plane entity and may be explicitly configured using one or more IP addresses. For M:N redundancy, a number of standby user plane entities corresponding to an active plane entity may be configured.

A user plane entity may be designated as an active user plane entity or a standby user plane entity. For example, the user plane entity 304 may be designated as an active user plane entity. The user plane entity 306 may be designated as a standby user plane entity. This designation may be configured on a per user plane entity basis. Association with an Sx interface may be initiated by a control plane entity or by a user plane entity. The selection of the initiating entity may be configurable on a per user plane entity basis.

A GPRS tunneling protocol (GTP) user plane (GTP-U) endpoint or another IP endpoint in a user plane entity may be a logical loopback IP address. A logical loopback IP address may facilitate moving logical IP endpoints from one user plane entity (e.g., an active user plane entity) to another user plane entity (e.g., a standby user plane entity) in the event of failure of the active user plane entity.

In some embodiments, when a user plane entity becomes active, the user plane entity may use a border gateway protocol (BGP) to advertise one or more routes to neighboring routers with lower cost. Accordingly, the active user plane entity may (e.g., always) receive new data that is routed to the user plane entity.

In some embodiments, an active user plane entity may use an Sx interface to checkpoint or update PDN information to an associated control plane entity. In this way, the control plane entity 302 may have the information it may need. For 1:1 redundancy, the control plane entity 302 may (e.g., immediately) send the PDN information to the dedicated standby user plane entity, e.g., the standby user plane entity 306. An Sx protocol and/or interface may carry (e.g., may be extended to carry) checkpoint information to the control plane entity 302. The standby user plane entity 306 may keep the PDN sessions ready and waiting to be made active, e.g., in the event of failure of the active user plane entity 304.

In some embodiments, the control plane entity 302 may act as a central node that may include a database, e.g., a master database. The control plane entity 302 may store and/or maintain PDN information that may be used to recover the PDNs on another user plane entity, e.g., the user plane entity 306, when a failure of the active user plane entity is detected. The control plane entity 302 may control and/or drive redundancy logic that may, for example, determine when the standby user plane entity 306 is activated.

For example, the control plane entity 302 may determine and/or evaluate conditions that may indicate that the active user plane entity has failed or that failure of the active user plane entity is imminent.

In some embodiments, the control plane entity 302 may detect failure of the active user plane entity, e.g., the user plane entity 304. The control plane entity 302 may detect failure using heartbeat or echo messages that may be communicated using the Sx interface. The control plane entity may detect failure using bidirectional forwarding detection (BFD). When the control plane entity 302 detects failure of the active user plane entity, the control plane entity 302 may make the dedicated standby user plane entity, e.g., the user plane entity 306, active. The dedicated standby user plane entity may already have the PDNs ready to be activated, e.g., if the control plane entity 302 sends the PDN information to the dedicated standby user plane entity as the control plane entity 302 receives the PDN information from the active user plane entity. If the dedicated standby user plane entity has PDNs ready to be activated, the dedicated standby user plane entity may activate them (e.g., immediately).

If no standby user plane entity remains to be made active (e.g., if the dedicated user plane entity has already been activated), the user plane redundancy may fail. Impacted sessions may not be recovered.

In some embodiments, the new active user plane entity, e.g., the user plane entity 306, may advertise the GTP-U and/or other IP endpoints. The user plane entity 306 may use a border gateway protocol (BGP) to advertise these endpoints with a lower route cost to neighboring routers. Network routers may be updated to carry data traffic pertaining to the impacted PDNs to the new active user plane entity, e.g., the user plane entity 306. When the PDNs are activated and new routes are advertised, the new active user plane entity may act like a normal active user plane entity. The new active user plane entity may continue to anchor the impacted PDNs. The new active user plane entity may start taking new PDNs to anchor.

In some embodiments, redundancy, e.g., 1:1 redundancy, may be used to support or facilitate software upgrades on user plane entities. Software residing on a user plane entity may be upgraded in a planned manner so that the user plane entity may be upgraded without impacting service. For example, a control plane entity may install or initiate installation of a software upgrade or update to software residing on an active user plane entity. While the software is upgraded or updated, the corresponding standby user plane entity may be activated to operate a session. When the software upgrade or update has completed, the original active user plane entity may be brought back online. The software upgrade or update may be propagated to the standby user plane entity.

Support for 1:1 user plane redundancy may facilitate providing carrier-grade redundancy to networks with control and user plane separation (CUPS). In some embodiments, a control plane entity may program PDN information in a dedicated standby user plane entity, e.g., without waiting to detect failure of the corresponding active user plane entity. Accordingly, recovery from a failure may be faster as compared with networks implementing N:M user plane redundancy.

In some embodiments, voice over LTE (VoLTE) may use a network having 1:1 user plane redundancy. Enterprise access point names (APNs) may benefit from 1:1 user plane redundancy. Some enterprise APNs may have stringent service level agreement (SLA) needs.

Figure 4:
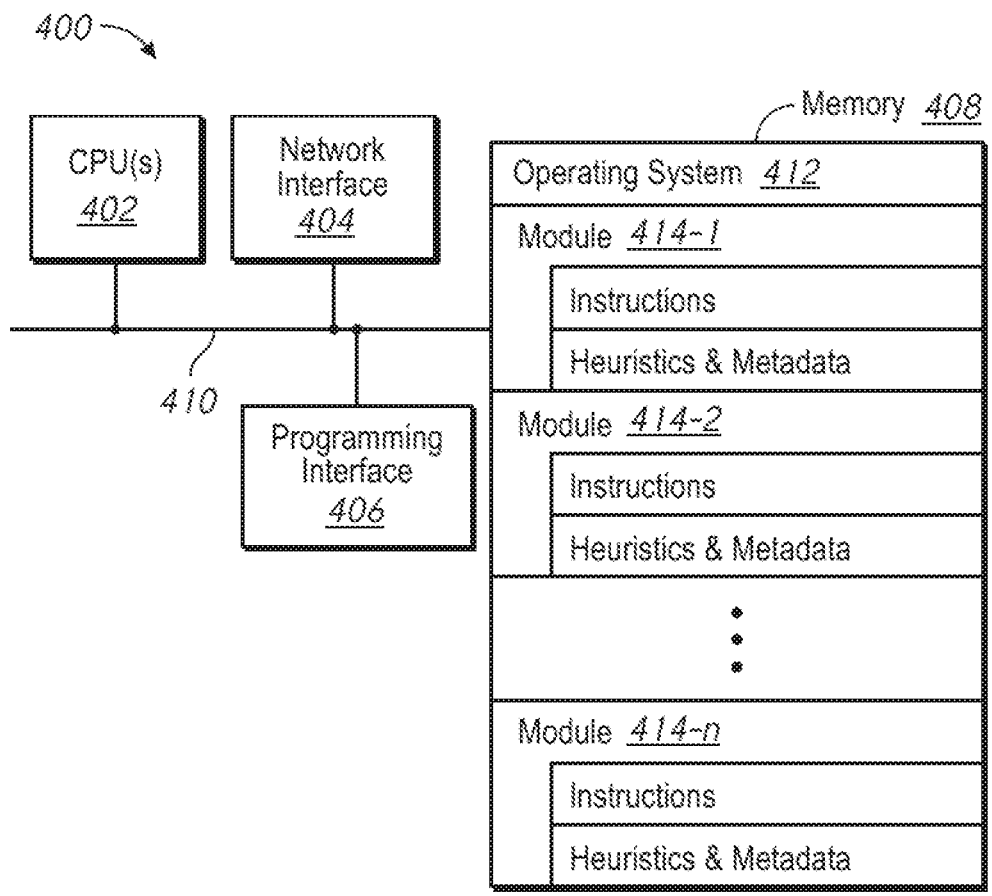
FIG. 4 is a block diagram that illustrates an example server system.

FIG. 4 is a block diagram of an example server system 400 enabled with one or more components of a device, server, or system in accordance with some embodiments. While certain specific features are illustrated, those of ordinary skill in the art will appreciate from the present disclosure that various other features have not been illustrated for the sake of brevity, and so as not to obscure more pertinent aspects of the embodiments disclosed herein. To that end, as a non-limiting example, in some embodiments the server system 400 may include one or more processing units (CPUs) 402, a network interface 404, a programming interface 406, a memory 408, and one or more communication buses 410 for interconnecting these and various other components.

The network interface 404 may be provided to, among other uses, establish and/or maintain a metadata tunnel between a cloud-hosted network management system and at least one private network including one or more compliant devices. In some embodiments, the one or more communication buses 410 may include circuitry that interconnects and controls communications between system components. The memory 408 may include one or more of high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. The memory 408 may include one or more storage devices remotely located from the one or more CPUs 402. The memory 408 may comprise a non-transitory computer readable storage medium.

In some embodiments, the memory 408 or the non-transitory computer readable storage medium of the memory 408 may include (e.g., store) the following programs, modules, and data structures, or a subset thereof including one or more of an operating system 412 or various modules 414-1, 414-2, . . . , 414-n. The modules 414-1, 414-2, . . . , 414-n, individually and/or collectively, perform one or more of the operations described herein. To that end, in various embodiments, the modules 414-1, 414-2, . . . , 414-n may include respective instructions and/or logic, and heuristics and metadata.

Various aspects of embodiments within the scope of the appended claims are described above. It should be apparent that the various features of embodiments described above may be embodied in a wide variety of forms and that any specific structure and/or function described above is merely illustrative. Based on the present disclosure, one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the second node are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device comprising a non-transitory memory and a processor in communication with the non-transitory memory, associating a first user plane entity with a user plane group comprising a plurality of user plane entities;
associating the first user plane entity with a second user plane entity;
obtaining, by a control plane entity, Packet Data Network (PDN) session information for the second user plane entity for a plurality of PDN sessions associated with the second user plane entity;
provisioning, by the control plane entity, the plurality PDN sessions on the first user plane entity, wherein the plurality of PDN sessions on the first user plane entity are not activated; and
in response to detecting a failure of the second user plane entity by the control plane entity, activating the first user plane entity, wherein the activating includes activating the plurality of PDN sessions on the first user plane entity.

2. The method of claim 1, further comprising designating the first user plane entity as a dedicated standby user plane entity corresponding to the second user plane entity.

3. The method of claim 1, further comprising designating the second user plane entity as an active user plane entity.

4. The method of claim 1, wherein the failure of the second user plane entity is detected by the control plane entity based on at least one of a heartbeat message communicated using an Sx interface or bidirectional forwarding detection (BFD).

5. The method of claim 1, further comprising:
causing installation of at least one of a software update or a software upgrade on the second user plane entity; and
activating the first user plane entity during the installation of the at least one of the software update or the software upgrade.

6. A control plane entity comprising:
a network interface in communication with a network;
a processor configured to execute computer readable instructions included on a non-transitory memory; and
the non-transitory memory including processor-readable instructions, that when executed by the processor, cause the control plane entity to
associate a first user plane entity with a user plane group comprising a plurality of user plane entities;
associate the first user plane entity with a second user plane entity;
obtain Packet Data Network (PDN) session information for the second user plane entity for a plurality of PDN sessions associated with the second user plane entity;
provision the plurality PDN sessions on the first user plane entity, wherein the plurality of PDN sessions on the first user plane entity are not activated; and
in response to detecting a failure of the second user plane entity by the control plane entity, activate the first user plane entity including activating the plurality of PDN sessions on the first user plane entity.

7. The control plane entity of claim 6, wherein the processor-readable instructions cause the control plane entity to designate the first user plane entity as a dedicated standby user plane entity corresponding to the second user plane entity.

8. The control plane entity of claim 6, wherein the processor-readable instructions cause the control plane entity to designate the second user plane entity as an active user plane entity.

9. The control plane entity of claim 6, wherein the failure of the second user plane entity is detected by the control plane entity based on at least one of a heartbeat message communicated using an Sx interface or bidirectional forwarding detection (BFD).

10. The control plane entity of claim 6, wherein the processor-readable instructions cause the control plane entity to:
cause installation of at least one of a software update or a software upgrade on the second user plane entity; and
activate the first user plane entity during the installation of the at least one of the software update or the software upgrade.

11. A non-transitory computer readable storage medium storing one or more programs, the one or more programs comprising instructions, that, when executed by a computing device with a non-transitory memory and one or more processors, cause the computing device to perform or cause performance of:
associating a first user plane entity with a user plane group comprising a plurality of user plane entities;
associating the first user plane entity with a second user plane entity;
obtaining, by a control plane entity, Packet Data Network (PDN) session information for the second user plane entity for a plurality of PDN sessions associated with the second user plane entity;
provisioning, by the control plane entity, the plurality PDN sessions on the first user plane entity, wherein the plurality of PDN sessions on the first user plane entity are not activated; and
in response to detecting a failure of the second user plane entity by the control plane entity, activating the first user plane entity, wherein the activating includes activating the plurality of PDN sessions on the first user plane entity.

12. The non-transitory computer readable storage medium of claim 11, wherein the instructions cause the computing device to perform or cause performance of designating the first user plane entity as a dedicated standby user plane entity corresponding to the second user plane entity.

13. The non-transitory computer readable storage medium of claim 11, wherein the instructions cause the computing device to perform or cause performance of designating the second user plane entity as an active user plane entity.

14. The non-transitory computer readable storage medium of claim 11, wherein the failure of the second user plane entity is detected by the control plane entity based on at least one of a heartbeat message communicated using an Sx interface or bidirectional forwarding detection (BFD).

15. The non-transitory computer readable storage medium of claim 11, wherein the instructions cause the computing device to perform or cause performance of:
causing installation of at least one of a software update or a software upgrade on the second user plane entity; and
activating the first user plane entity during the installation of the at least one of the software update or the software upgrade.

16. The method of claim 1, wherein the PDN session information is obtained by the control plane entity from the second user plane entity via an Sx interface.

17. The method of claim 1, wherein the control plane entity is a System Architecture Evolution Gateway (SAEGW) control plane entity.

18. The control plane entity of claim 6, wherein the PDN session information is obtained by the control plane entity from the second user plane entity via an Sx interface.

19. The control plane entity of claim 6, wherein the control plane entity is a System Architecture Evolution Gateway (SAEGW) control plane entity.

20. The non-transitory computer readable storage medium of claim 11, wherein the PDN session information is obtained by the control plane entity from the second user plane entity via an Sx interface.

* * * * *